United States Patent
Maturana et al.

(10) Patent No.: US 6,427,221 B1
(45) Date of Patent: *Jul. 30, 2002

(54) SELF-ORGANIZING ROLLING MILL SYSTEM IMPORTING NEIGHBOR CONSTRAINT RANGES

(75) Inventors: Francisco P. Maturana; Rebecca J. Herr, both of Twinsburg; David A. Vasko, Macedonia; Joseph A. Lenner, Hudson, all of OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/290,455

(22) Filed: Apr. 12, 1999

Related U.S. Application Data

(63) Continuation-in-part of application No. 09/261,275, filed on Mar. 3, 1999, now Pat. No. 6,272,391, and a continuation-in-part of application No. 09/164,204, filed on Sep. 30, 1998, now Pat. No. 6,091,998.

(51) Int. Cl.$^7$ ................................................ G06F 11/00
(52) U.S. Cl. ........................ 714/798; 700/100; 700/103
(58) Field of Search ............................. 364/148, 468.06, 364/468.05, 468.01, 468.09, 468.15, 131; 345/467; 705/8, 7; 72/7.1, 7.2; 29/832; 700/100, 103; 365/225.7; 714/798

(56) References Cited

U.S. PATENT DOCUMENTS

| | | | | |
|---|---|---|---|---|
| 5,038,269 A | * | 8/1991 | Grimble et al. | 364/148 |
| 5,093,794 A | * | 3/1992 | Howie et al. | 364/148 |
| 5,126,945 A | * | 6/1992 | Jenista et al. | 364/468.05 |
| 5,216,593 A | * | 6/1993 | Dietrich et al. | 345/467 |
| 5,353,229 A | * | 10/1994 | Tanaka | 3645/468.08 |
| 5,406,476 A | * | 4/1995 | Deziel, Jr. et al. | 705/8 |
| 5,659,478 A | * | 8/1997 | Pennisi et al. | 364/468.01 |
| 5,797,288 A | * | 8/1998 | Mas | 72/7.1 |
| 5,808,891 A | * | 9/1998 | Lee et al. | 364/468.15 |
| 5,845,258 A | * | 12/1998 | Kennedy | 705/8 |
| 5,909,368 A | * | 6/1999 | Nixon et al. | 364/131 |
| 5,912,678 A | * | 6/1999 | Saxena et al. | 364/468.09 |
| 5,946,212 A | * | 8/1999 | Bermon et al. | 29/832 |
| 5,950,170 A | * | 9/1999 | Pan et al. | 705/7 |
| 5,953,229 A | * | 9/1999 | Clark et al. | 700/100 |
| 5,953,279 A | * | 9/1999 | Kim et al. | 365/225.7 |
| 6,091,998 A | * | 7/2000 | Vasko et al. | 700/100 |
| 6,094,955 A | * | 8/2000 | Vasko et al. | 72/7.2 |
| 6,272,391 B1 | * | 8/2001 | Maturana et al. | 700/103 |

* cited by examiner

*Primary Examiner*—David Ton
(74) *Attorney, Agent, or Firm*—Keith M. Baxter; Alexander M. Gerasimow; R. Scott Speroff

(57) ABSTRACT

A rolling mill system uses a number of autonomous control units, each associated with one piece of equipment of the rolling mill system. The autonomious control units include data indicating not only their constraints of operation, but also reflecting the constraints of operation of machines to which they are attached and with which they share common operating parameters. An autonomous control unit associated with a machine having operating parameters in common with another machine of the rolling mill system adopts the intersection of the ranges of the machine constraints of the two machines. Machine constraints are preserved to the extent possible as ranges, so as to permit flexibility in selecting and seeking goals by the individual autonomous control units.

12 Claims, 6 Drawing Sheets

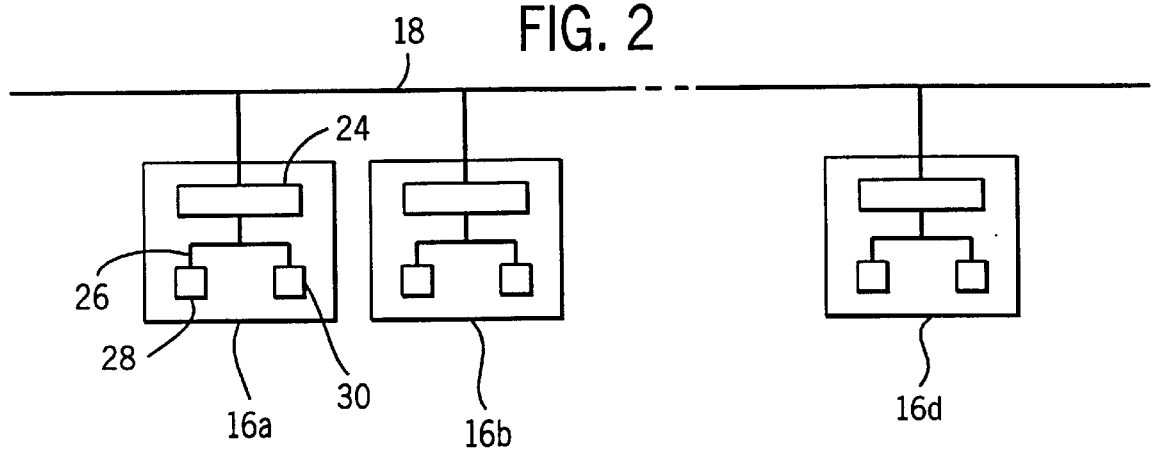
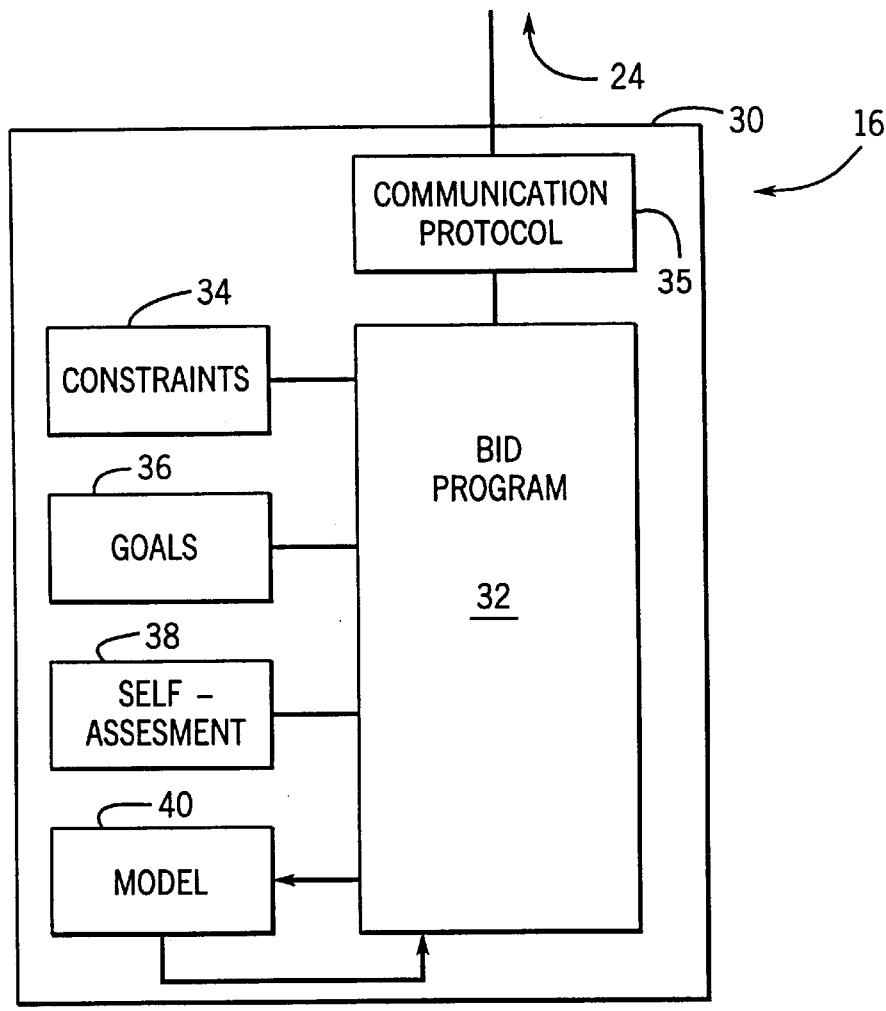

SELF-ORGANIZING ROLLING MILL SYSTEM IMPORTING NEIGHBOR CONSTRAINT RANGES

CROSS-REFERENCE TO RELATED APPLICATIONS

This application is a continuation-in-part of U.S. application Ser. No. 09/164,204 filed Sep. 30, 1998 and entitled: Self-Organizing Industrial Control System Using Bidding Process, now U.S. Pat. No. 6,091,998 and is a continuation in part of U.S. application Ser. No. 09/261,275 filed Mar. 3, 1999 and entitled: Self Organizing Industrial Control System Importing Neighbor Constraint Ranges, now U.S. Pat. No. 6,272,391.

STATEMENT REGARDING FEDERALLY SPONSORED RESEARCH OR DEVELOPMENT

BACKGROUND OF THE INVENTION

The present invention relates to rolling mill systems of machines for the production of metal shapes and in particular to a rolling mill system capable of automatic configuration for the performance of a specified metal shape production job.

Rolling mills employ a set of movable rollers to shape metal billets into a variety of "shapes" such as angle, channel or rod of various diameters. A rolling mill is typically used as part of a rolling mill system, including, for example, an upstream reheat furnace or continuous casting machine providing heated billets, and a downstream water bath or Stelmor conveyor cooling the rolled material.

A given rolling mill system is capable of producing a wide variety of shapes by a changing in the operational parameters of the system including the roller dies, die separation, rolling speeds and temperatures. In a rolling mill system including multiple rolling mills, furnaces and cooling baths, the path through the machines may also be varied.

Reconfiguring a roller mill system is currently time consuming and expensive, and involves not only setting the operating parameters for each of the component pieces of equipment, but ensuring that there is consistency between those operating parameters. For example, speed through the water bath normally must match the desired rolling speed through the rolling mill. This step of ensuring a matching of operating parameters between the component machines of the rolling mill system complicates the selection of optimal through the rolling mill. This step of ensuring a matching of operating parameters between the component machines of the rolling mill system complicates the selection of optimal operating parameters and makes determining the trade-offs between the settings for different machines harder. This arises from the fact that although each machine may be modeled in a forward direction, that is, it may be determined how a change in rolling speed or die separation affects the billet temperature, the machines are not easily modeled in the reverse direction where there is no functional mapping. Thus, if a downstream water bath requires a different billet speed from a rolling mill, adjustment of the rolling mill presents a complex variety of alternatives.

For this reason, it is normally desired to minimize the changes in rolling mill setup, a desire that is at odds with economic demands to change the rolling mill setup frequently and quickly to respond to changing product demand. It would be beneficial to have a rolling mill system that could automatically and quickly organize itself to produce the desired product. It would further be desirable that this system accommodate a large variety of different types of rolling mill equipment.

BRIEF SUMMARY OF THE INVENTION

The present invention provides a simplified bidding process for a rolling mill system in which prior to bidding, there is an exchange of operational constraints between the elements of the rolling mill system. In this exchange step, the autonomous controllers compare the ranges of their machine's inputs and outputs to corresponding ranges of connected inputs and outputs of predecessor and successor machines in the rolling mill system. By internalizing these ranges, the bidding process is substantially simplified. Further to the extent possible, inconsistencies in the ranges are remedied by producing new ranges rather than individual values. In this way, local choice and optimization provided by the bidding process is preserved.

Specifically, the present invention provides an automatically configurable rolling mill system, including a rolling mill having entrance-receiving billets at an input temperature, a set of rolls rolling the received billets to change the billets by a rolling diameter as moved at a rolling speed, and an exit discharging the rolled billets at an output temperature. A rolling mill controller associated with the rolling mill includes an electronic memory holding data representing rolling mill constraints indicating constraints on the operation of the rolling mill, and inter-machine relationships indicating physical operating parameters of the rolling mill dependent on the physical operating parameters of other machines to which the rolling mill is connected. A controller further includes an electronic computer executing a stored program to receive a job plan describing a job to be performed by the rolling mill and other machines. An electronic computer then modifies the rolling mill constraints identified by the inter-machine relationships by the corresponding machine constraints of the other machines, and after this modification, exchanges bids and counterbids with the other machines proposing completion of portions of the job plan by the rolling mill and the other machines. Finally, the feasibility of the bids and counterbids are evaluated by the electronic computer against the modified rolling mill constraints.

Thus, it is one object of the invention to provide a more rapid convergence on a solution for organizing the machines of a rolling mill system by providing each autonomous control unit of the rolling mill system with information about constraints that may be imposed on the job plan by other machines. By bringing this information into each autonomous control unit, inefficient communication between the autonomous control units is minimized and a solution to the allocation of the job plan among the machines is more rapidly obtained.

The memory may hold multiple machine constraints and multiple inter-machine relationships identified to different material paths between machines. The machine constraints associated with a given material path are modified by the machine constraints of the other machines related by the inter-machine relationships associated with the given material path.

Thus, it is another object of the invention to address constraints imposed by adjacent machines without unduly limiting the solution sought by the autonomous control units. By segregating constraints according to machine paths, constraints applicable to one machine path are not necessarily imputed to the other machine paths.

The rolling mill system may also include reheat furnaces and water cooling baths also adapted to convey their constraints to other machines.

Thus, it is another object of the invention to provide an efficient negotiation process uniformly over many machines of the rolling mill system, all employing the autonomous control system of the present invention.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 2 is a schematic block diagram of the autonomous control units of FIG. 1 showing the inter-connection of the autonomous control units through interfaces on a common link and processors and memories of the autonomous control units;

FIG. 3 is a detailed block diagram of the memory of one autonomous control unit of FIG. 2 showing the contained bid program, constraint data, goal data, self-assessment data, and a model of the equipment associated with the autonomous control unit;

DETAILED DESCRIPTION OF THE INVENTION

Components of the Control System

Figure 1:
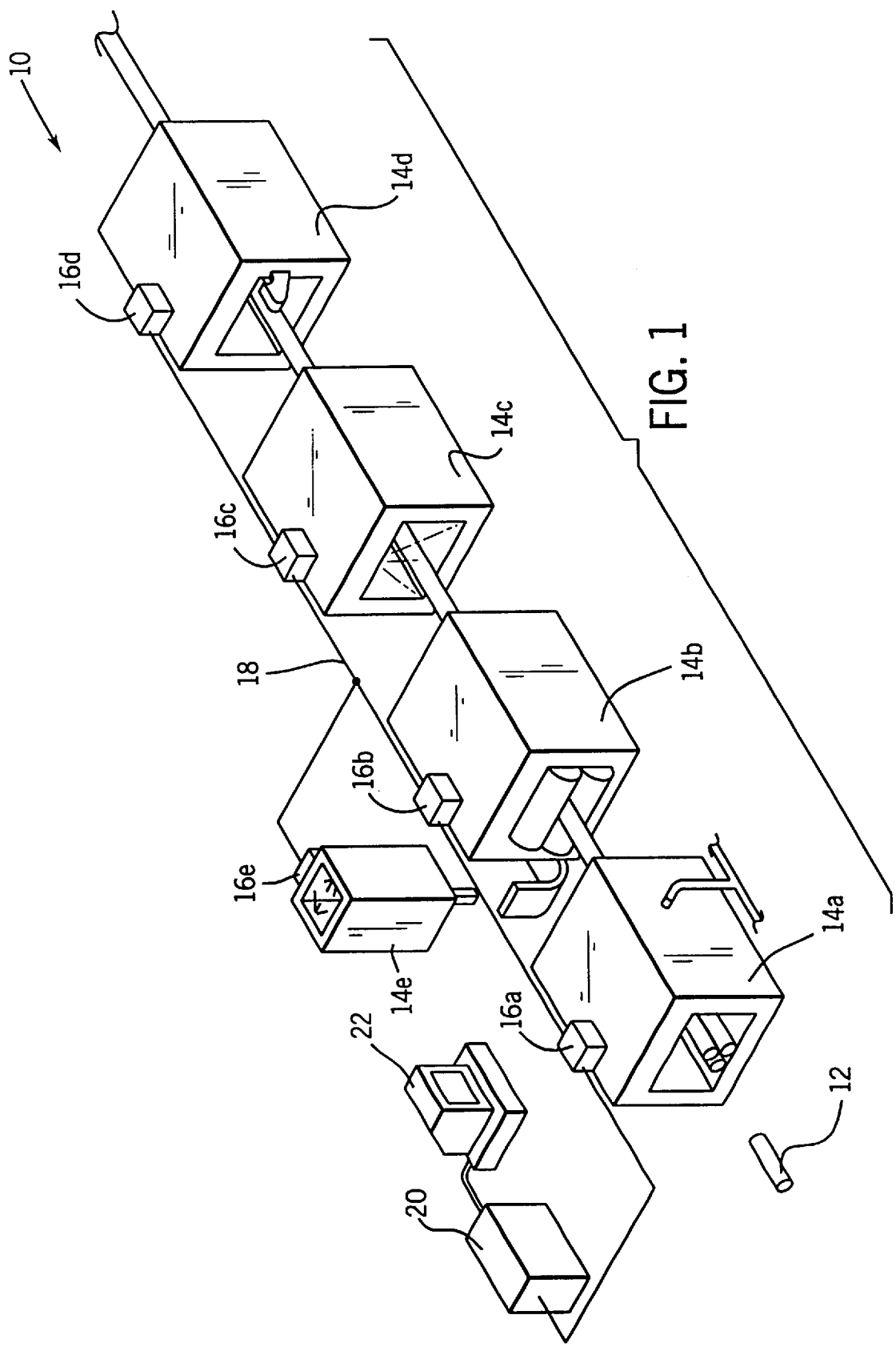
FIG. 1 is a perspective view of a simplified rolling mill composed of a sequential set of machines each associated with an autonomous control unit per the present invention.

Referring now to FIG. 1, an industrial process 10 may provide for the processing of metal billets 12 through a series of machines 14. Each machine 14 may have an associated autonomous control unit 16 being either discrete devices as shown in FIG. 1 or portions of a centralized machine. The autonomous control units 16 may be separate computers interconnected by a common communication link 18 and also connected by the communication link 18 to a controller 20 and a human/machine interface such as a computer terminal 22 of conventional design. Alternatively, the autonomous control units 16 may be partitions of controller 20 communicating with the machines 14 via sensors and actuators on the machines 14.

In an example process 10 suitable for control by the present invention, machines 14 may include a reheat furnace 14a for heating precast billets 12 to a predetermined temperature, a rolling mill 14b for rolling the billets 12 to a predetermined diameter, a water bath 14c for cooling the billets 12 with water and a Stelmor conveyor 12d cooling the billets 12 with air. The billets 12 may alternatively come directly from a continuous casting machine 14e at casting temperature without the need for reheating by reheat furnace 14a. In this case the billets pass directly from the continuous caster 14e to the rolling mill 14b.

Referring now to FIGS. 2 and 3, each autonomous control unit 16 includes an interface circuit 24 connected with the common communication link 18 and handling communication protocols so that the autonomous control units 16 may communicate bids and counterbids among themselves and may receive a job description as will be discussed below. The interface circuits 24 of each autonomous control unit 16 are connected by an internal bus 26 to a processor 28 and memory 30.

Data Structures

Referring now to FIG. 3, the memory 30 holds a bid program 32 that will be used to generate bids and counterbids to be exchanged among the autonomous control units 16 in developing a control strategy for the machines 14. The bid program 32 communicates with the other autonomous control units 16 according to a communications protocol program 35 which also serves to store and sort bids and counterbids and job descriptions and direct bids and counterbids to the correct device as will be described.

The bid program 32 has access to stored data tables representing constraint data 34 which generally quantifies the limitations of performance of the associated machine 14, goal data 36 which describes preferences among modes of operation of the associated machine 14 within the constraints 34, self-assessment data 38 generally describing the dynamic state of the associated machine, and a model 40 modeling operation of the associated machine by mathematical means.

Figure 4:
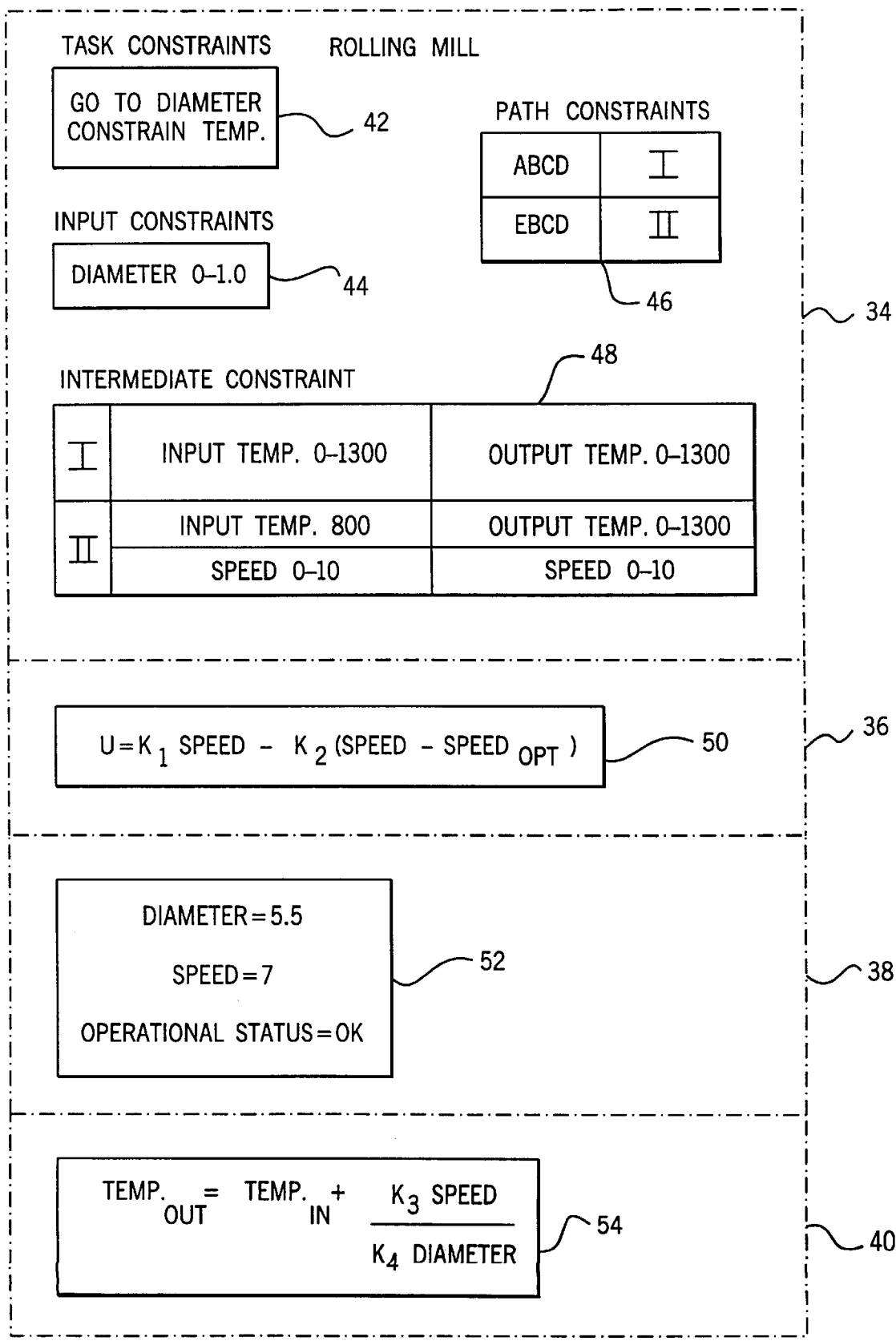
FIG. 4 is a expanded block diagram of the constraint data, goal data, self-assessment data, and model of FIG. 3.

Referring to FIG. 4, the constraints 34 are of a number of different kinds. Task constraints 42 describe generally the kind of operation that the associated machine 14 is intended to perform. Thus, for example, the reheat furnace 14a may perform heating tasks (GOTO TEMP), the rolling mill 14b (as shown) may perform a diameter reduction task (GOTO DIA.). The task constraints 42 allow the autonomous control units 16 to make a threshold determination as to whether their associated machines 14 will make a bid for a particular task of a plan to produce a product. Continuing with the example of the rolling mill 14b, the autonomous control unit 16a of the rolling mill 14b will only bid for tasks requiring diameter reductions.

The constraint data also includes input constraints 44 which describe the limits of the inputs to the associated machine 14. The inputs (as opposed to the outputs of the machines 14) are well defined and their ranges are set by the physical design of the machine. For example, for the rolling mill 14b, the input will be amount of gas valve opening and the range of the input will be from zero to one hundred percent. For the rolling mill 14b, the inputs will be rolling diameter from 0 to 1. For the water bath 14c, the input will be water flow rate and for the Stelmor conveyor 14d, the inputs will be air flow rate. As used herein, input constraints are only those constraints independent of the operation of other machines 14.

The constraints 34 also include path constraints 46 which generally reflect limitations on the possible paths of the product, the billet 12, between machines 14 as dictated by their physical layout. In this example, two paths are available, the first in which the billet 12 passes from reheat furnace 14a to rolling mill 14b, then to water bath 14c and finally to Stelmor conveyor 14d and the second where the billet 12 passes from continuous caster 14e to rolling mill 14b then to water bath 14c and finally to Stelmor conveyor 14d. These path topologies are reflected in the path constraints 46 listing the path in a first column and a set of intermediate constraints 48 (as will be described) in a second column. From this table, all possible paths between machines 14 may be determined. The task constraints 42, the path constraints 46 and the input constraints 44 will be termed generally "operational" constraints as they constrain the operation of the machine 14 in contrast to the intermachine constraints to be described below.

Figure 5:
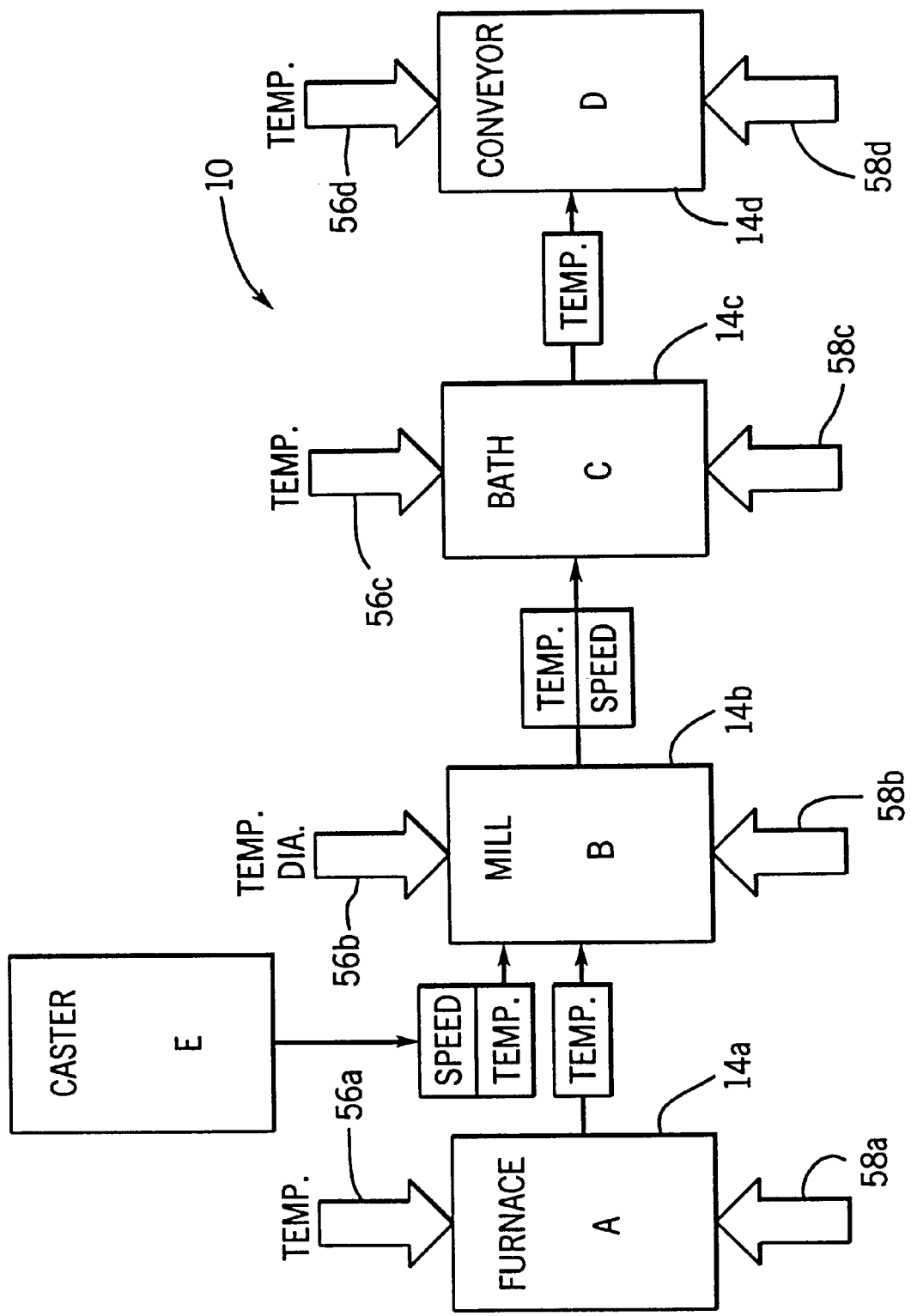
FIG. 5 is a graphical representation of the equipment of the rolling mill of FIG. 1 as defined by various inputs and constraints.

Referring also to FIG. 5, deriving from the path constraints 46 and possibly including other inputs of the machines 14 are the "inter-machine" or "intermediate" constraints 48 representing operating parameters shared between machines 14 based on the path of the material between machines 14. Generally these intermediate constraints 48 connect identical operating parameters of the machines 14 forming outputs of upstream machines in the material path with inputs of downstream machines in the material flow path. Thus the input temperature of the rolling mill 14b will be constrained to be equal to output temperature of the reheat furnace 14a or the output temperature of the continuous caster 14e depending on the particular path. The continuous caster 14e has an output speed and hence this is an inter-machine constraint for that path only. Generally, the rolling mill 14b and water box 14c also share output and input temperatures, respectively, and also billet speed i.e., the speed of exit of the billet 12 from the rolling mill 14b equaling the speed of entry of the billet into the water box 14c.

As a result of the coiling of the billet product in the Stelmor conveyor 14d, the water box 14c and Stelmor conveyor 14d do not share the parameter of conveyor speed but do share the parameter of temperature as the temperature of the billet output from the water box 14b will equal the temperature of the billet 12 entering to the Stelmor conveyor.

Referring again to FIGS. 3 and 4, the memory may also hold goal data 36 implemented as a utility function 50 having as input arguments one or more of the characterizing parameters of the machine 14 either inputs or outputs, and as a value an arbitrarily defined utility which reflects a preprogrammed goal of the autonomous control unit 16. In the case of the rolling mill 14b, the utility function 50 may be a function of speed reflecting a desire for high production, but also a particular speed for metallurgical reasons. A more complex utility function 50 might consider other metallurgical properties and wear on the equipment. Generally the autonomous control unit 16 strives to maximize utility within the operational and intermediate constraints.

Other machines will have other goals as selected and programmed by the user or manufacturer. The goals for the reheat furnace 14a, the water box 14c and Stelmor conveyor 14d are generally reduction of gas, water and air volume, respectively.

Referring still to FIGS. 3 and 4, the self-assessment data 38 will typically include various sensed parameters 52 of the associated machine 14. As shown in FIG. 4 for the rolling mill 14b, the self-assessment data includes current rolling diameter and the rolling speed (sensed outputs). A general operational status for the rolling mill 14b may also be provided as generated from other inputs and outputs and possibly a heuristic program evaluating the fitness of the machine 14. Generally the self-assessment data 38 is used to modify the operation constraints 34 if the operational status of the machine 14 is somehow impaired.

The model 40 provides a mathematical description 54 relating inputs to the machine 14 to its outputs. In the example of the rolling mill 14b, a simple linear equation of three variables is shown relating output temperature of the rolling mill 14b to the input temperature the rolling speed and the diameter reduction. This model reflects generally the fact that the rolling process can increase the temperature of the stock. Generally far more complex models may be created relating one or more inputs to particular outputs of the machine. In most cases, the inverse of the model function is not also a function and thus an iterative process must be used to deduce an input from an output such as a binary search using successive input values until the desired output is arrived at.

For the reheat furnace 14a, the model 40 will take into account the time integral of the gas valve opening as reflects the heating of the furnace. The model for the water box 14c may relate cooling water flow and process speed to surface and internal temperatures. The model 40 for Stelmor conveyor 14d will provide a time and air flow relationship to temperature of the output billet 12. The construction of such models is generally understood in the art and will depend on the particular machine 14.

Job Description Language

Referring now to FIGS. 1 and 5, a "product" autonomous control unit 16 may be implemented by an arbitrary controller 20 to represent the desired product to be manufactured from the billet 12. This product autonomous control unit provides a convenient unit for implementing the functions of describing the product to the autonomous control units 16 of the machines 14 and of evaluating the plans produced by the autonomous control units 16 against the product definition. For this first task, the product autonomous control unit accepts input from a user through computer terminal 22 describing the product characteristics and produces a machine independent description of desired tasks for producing that product in a job description language. In the preferred embodiment, the job description language is an ASCII text file providing a number of steps defining desired machine outputs. For example, to produce a rolled billet, the job description is as follows:

STEP 1= GOTO TEMP(ALL)<1300.0
STEP 2= GOTO DIAMETER=5.5 TOL(−0.2, 0.2) CONSTRAIN TEMP(ALL)<1300.0 CONSTRAIN TEMP(ALL)>825.0 AT TIME=END DEPENDS ON (1)
STEP 3= GOTO TEMP(SURF)=850 TOL(−5.0, 5.0) CONSTRAIN TEMP(ALL)>825.0 AT TIME=0.0 CONSTRAIN TEMP(SURF)>450.0 AND<1300.0 WITH DIAMETER=5.5 DEPENDS ON (2)
STEP 4= GOTO TEMP(AVG)=650.0 TOL(−5.0, 5.0) IN TIME<15.0 CONSTRAIN TEMP(SURF)>500 AT TIME>=0.0 AND <=2.0 WITH DIAMETER=5.5 DEPENDS ON (3)
STEP 5= GOTO TEMP(AVG)=600.0 TOL(−5.0,5.0) IN TIME>40.0 WITH DIAMETER =5.5 DEPENDS ON (4)

Each step defines temperatures (TEMP), diameters (DIAMETER) and tolerances (TOL) of the billet and the sequence (DEPENDS ON) and timing (AT TIME) of the steps. In this example both surface temperature (SURF) and overall temperature (ALL) is considered and so the models 40 must provide outputs for both.

Operation of the Control System

Figure 6:
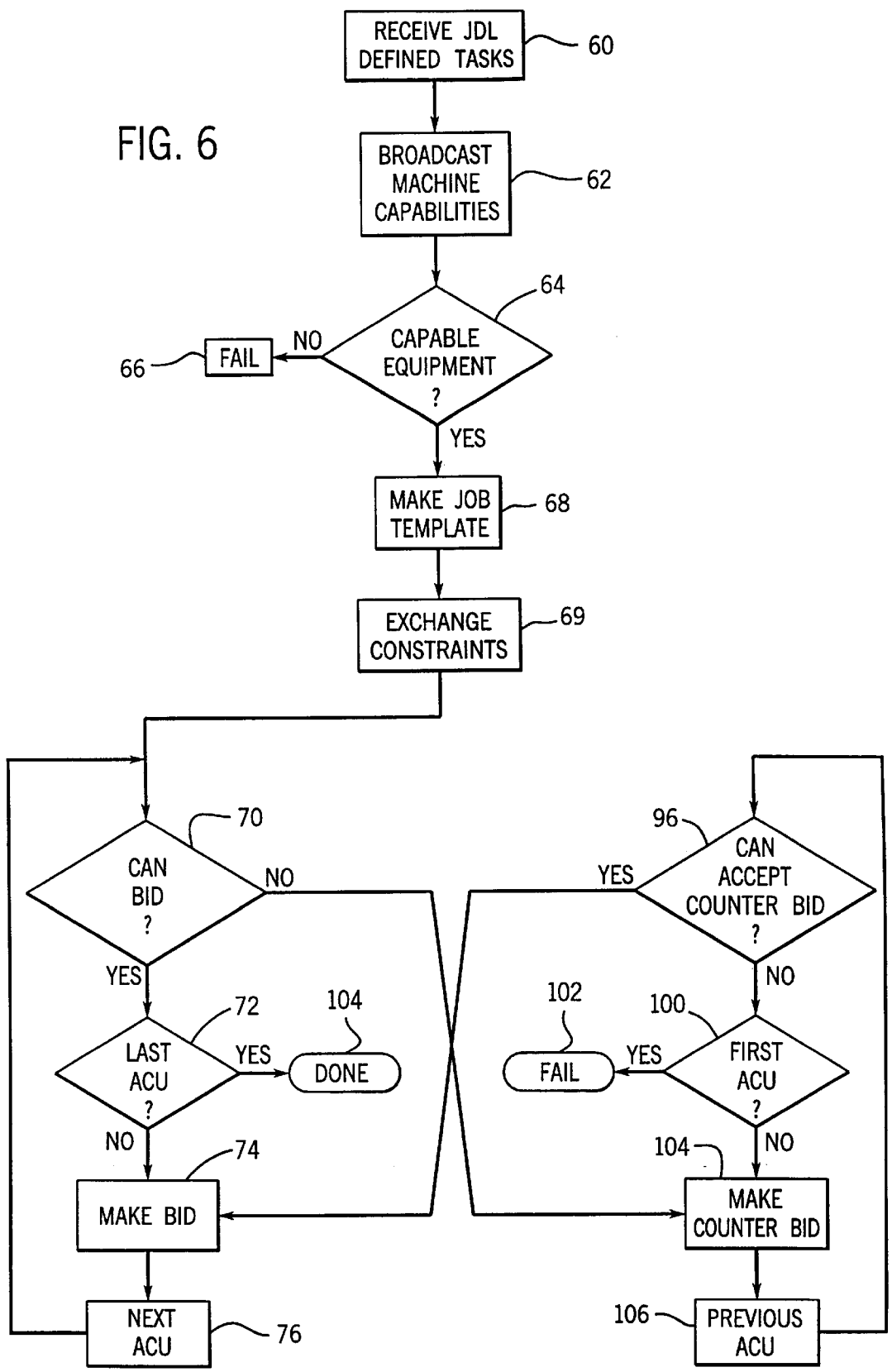
FIG. 6 is a flow chart of the bid program of FIG. 3 such as may be used to generate a control strategy for the machines of FIGS. 1 and 5.

The operation of the autonomous control units 16 (and the controller 20) will now be described with reference to the flow chart of FIG. 6. The flow chart of FIG. 6 is executed in part by different autonomous control unit 16a and the controller 20 as will be apparent from context.

At a first step, the job description language (JDL) is generated by the autonomous control unit implemented in controller 20 for the product is represented by process block 60. At succeeding process block 62, the JDL is broadcast over the communication link 18.

As indicated by decision block 64, each autonomous control unit receiving the broadcast JDL evaluates the tasks of the JDL generally in light of its own task constraints 42 and submits to the most upstream autonomous control unit 16 in the path (indicated by the path constraints 46), and in this case the reheat furnace 14*a*, an indication of which tasks represented by steps in the JDL it can perform.

The most upstream autonomous control unit 16*a*, based on the received indications about task capability from the other autonomous control units 16, next tries to create one or more "template job plans" representing a possible allocation of tasks to machines 14. In the event that there is not at least one autonomous control unit 16 indicating an ability to perform at least each step of the JDL, the most upstream autonomous control units 16*a* proceeds to a fail state 66 indicating that the desired product cannot be produced by the machines 14.

More typically at process block 68, one or more job templates will be created as described. A number of different job templates may address different allocation of machines 14 to different steps of the JDL or different material flow paths in the case where the topology is not as simple as the example used herein. Or different job templates may address different products.

The job plans are then broadcast to the autonomous control units 16 which extract the path constraints 46 from the material paths contained in the job plans and establish a set of machine relationships manifest in the inter-machine constraints 48. A different set of machine relationships will be prepared for each job plan reflecting possibly different material paths and hence different machine interactions. Each autonomous control unit 16 initially is programmed with a set of ranges for the intermediate constraints 48, the ranges based on the known characteristics of the machine associated with the autonomous control unit 16, for example, a speed or temperature range which may be determined by the design of the machine 14. As indicated by process block 69, these initial ranges are then exchanged with the upstream and downstream machines sharing the same operational parameters as indicated by the inter-machine constraints 48. For example, for a first path where rolling mill 14*b* receives billets 12 from the reheat furnace 14(*a*), the oven output temperature range may be 0 to 2000 degrees substantially larger than the rolling mill 14*b* input temperature range of 1000 to 1200 degrees. In this case, the intersection of these two ranges 1000–1200 is adopted by the reheat oven 14*a* and the rolling mill 14*b* for this shared parameter. In contrast, for a second path where the rolling mill 14*b* receives billets 12 from the continuous caster 14(*e*), the casting process may require a narrow temperature range about 800 degrees so as to preserve pliability of the billets 12 and to prevent eruption of the cooling liquid interior. In this case, the intersection of the ranges for the continuous caster 14*e* and the rolling mill 14*b* is the single value 800. Note that if the rolling mill 14*b* had a smaller range in input temperature than the output of the continuous caster 14*e*, the smaller range of the rolling mill 14*b* would be adopted by the continuous caster.

The purpose of this exchange of ranges is to simplify the bidding process which is described below by enabling the autonomous control units to eliminate bids, and hence avoid the bidding process for values outside the combined solutions space of these ranges.

After this exchange, the most upstream machine 14, either the reheat furnace 14*a* or the continuous caster 14*e*, then reads the first step of the JDL, which in this case indicates that the temperature of the product should be raised to a value of less than 1300 degrees, and evaluates whether it can create a bid for that task as indicated by process block 70. Specifically, the autonomous control unit 16 evaluates its current temperature in its self-assessment 52 and its goals 36 and the requirements of the JDL to create a bid indicating a specific temperature to which the reheat furnace will raise the billet 12. In this case the intermediate constraints 48 are those associated with the reheat furnace 14*a* and material path I. Simultaneously, a similar process is performed by the continuous caster 14*e* for material path II.

Assuming that the autonomous control unit 16*a* of the reheat furnace 14*a* (and/or the continuous caster 14*e* ) may make a bid within the above constraints, the program proceeds to decision block 72 to test if this is the last autonomous control unit on the job path (i.e., in either case, the Stelmor conveyor 14*d*). At this time it is not, and so the program proceeds to process block 74 where the bids are perfected by transmitting them to the succeeding rolling mill 14*b* and more generally to the autonomous control unit(s) immediately downstream from the autonomous control unit 16 making the bid. The autonomous control unit 16*a* also updates an internal bid storage table (not shown).

The process then proceeds to the next autonomous control unit 16*b* as generally shown by process block 76. The next autonomous control unit 16*b* associated with the rolling mill 14*b* receives the template plans and the bids proposed by the reheat furnace 14*a* and the continuous caster 14*e*. At process block 70, autonomous control unit 16*b* determines whether it can make a bid based on the information from the JDL and on the constraints 34, including this time, constraints from the intermediate constraint table 48 which links the input temperature or the rolling mill 14*b* to the output temperature of the reheat furnace 14*b* or continuous caster 14*e* depending on the bid. The modification of the intermediate constraint table 48 to reflect the restraints of adjacent machines makes this generation of the bids more robust against constraints of the other machines and thus less likely to trigger time consuming counterbids. Nevertheless, because the counterbid process strives to preserve the range of the intermediate constraint table 48, the autonomous control unit making the bid can exercise some influence on the job plan from its unique goals.

In the example given, the JDL requires that the temperature of the billet 12 be greater than 825 degrees at the end of the rolling. Assuming for the moment that the temperature selected by the reheat furnace 14*a* is insufficient for the rolling mill 14*b* to reach the required output temperature (as may be determined by model 40 for the rolling mill 14*b*), then at process block 70, the autonomous control unit 16*b* proceeds to process block 104 to generate a counterbid because no bid could be generated meeting the then existent constraints.

For the counterbid, the autonomous control unit 16*b* must first determine an acceptable input temperature to the rolling mill 14*b*. Generally this cannot be done by consulting stored input constraints for temperature because the relevant constraints will dynamically depend on the particular output temperature required. Accordingly the program 32 of the autonomous control unit 16*b* must refer to the model 40.

Figure 7:
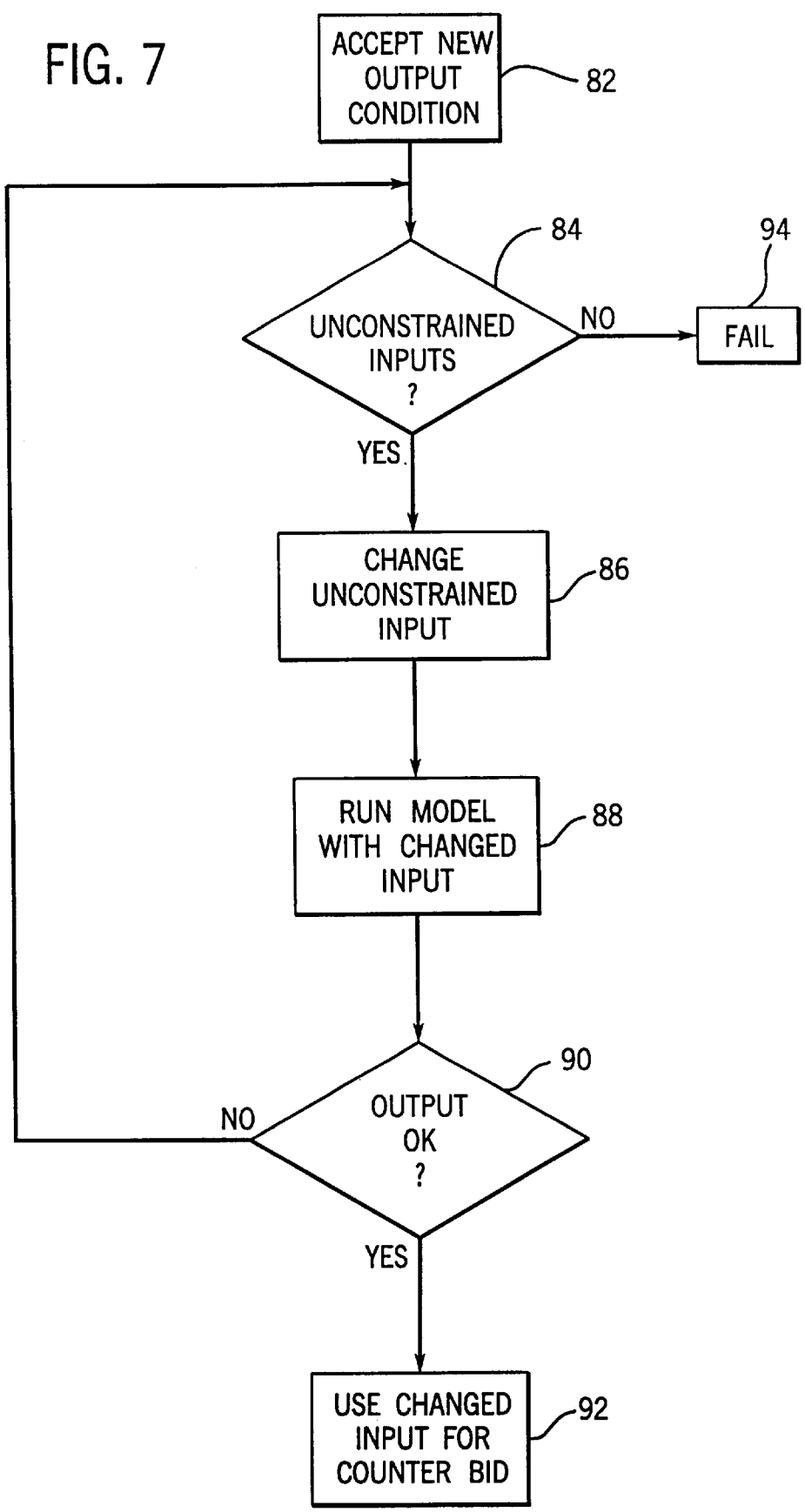
FIG. 7 is a flow chart of the operation of the model of FIGS. 3 and 4 in the responding to a counterbid per the flow chart of FIG. 6.

Referring now to FIG. 7, the process of determining the necessary input temperature (or an arbitrary input value from a defined output) begins at a process block 82 in which the new defined output condition is established. In this example the output condition is a temperature of greater than 825 degrees as required by the JDL.

At decision block 84, an unconstrained input is identified, in this case an input temperature from the reheat furnace 14*a* within temperature range permitted by the rolling mill 14b. By unconstrained it is meant that the input may be varied in a desired direction without violating the inputs constraints 44.

At process block 86, the identified input is modified in a direction to reduce the difference between the desired output value (per the JDL and process block 82) and the modeled output value produced by evaluating the model 40 with the unmodified input. The modified input is then evaluated by executing the model 40 as indicated at process block 88 to produce a new output.

At decision block 90, the current output from the model 40 is matched to the desired new output from process block 82 and if the outputs match within a tolerance, the modified input established at process block 86 is used for the counterbid as indicated by process block 92. The counterbid incorporates a new range for the input rather than a single input value so as to preserve the flexibility of the autonomous control units accepting the counter bid as much as possible. If the modification of the input was downward, then the input becomes the new upper boundary of the input range, whereas if the modification of the input was upward, the input becomes the new lower boundary of the range. The new range is forwarded to autonomous control units for the corresponding upstream machine as part of the counterbid.

More typically, at least initially, the outputs will not match and the program loops back to process block 84 for a second or subsequent iteration. If prior to a matching of the outputs, the input becomes constrained and there are no further inputs that can be modified, the program proceeds to a fail block 94 indicating the process cannot be completed.

Referring again to FIG. 6, assuming that a suitable counterbid can be obtained at process block 92 of FIG. 7, the counterbid is perfected by forwarding it to the proceeding autonomous control unit 16, in this case, autonomous control unit 16a for the reheat furnace 14a.

Autonomous control unit 16a receiving the counterbid at decision 96, adopts the new range of operational parameters contained therein for its intermediate constraints associated with the particular path of the relevant job plan and then determines whether it can accept the counterbid's new proposed output temperature range by modifying its original bid. The model 40 for the reheat furnace 14a (not shown) may be invoked to determine whether with practical inputs (per input constraints 44), the desired output temperature value can be obtained. Often a range of possible modified bids are available and one bid is selected by use of the goal 50. The counterbid may be accepted if the autonomous control unit 16a can create a bid within the new range as indicated by process block 74. This new bid is sent to the next succeeding autonomous control unit 16b as part of the job template as before and received by autonomous control unit 16b at process block 70 as has been described. Note that because the modified intermediate constraints are always a subset of the original intermediate constraints, the new bid will also satisfy the original intermediate constraints.

Referring again to decision block 96, if the counterbid cannot be accepted then at decision block 100, a test is performed to see if the autonomous control unit 16 receiving the counterbid is the first autonomous control unit 16. If it is, then the program proceeds to process block 102 and a failure condition is indicated as would be the case were the reheat furnace 14a receiving the counterbid.

More typically, however, the autonomous control unit 16 receiving a counterbid will not be the first autonomous control unit 16 and thus it is possible to make yet another counterbid indicated by process block 104 to yet an earlier autonomous control unit 16 so as to possibly relax an earlier intermediate constraint.

Bids and counterbids may thus ripple up and down the chain of autonomous control units 16a, 16b, 16c, and 16d and the chain of autonomous control units 16e, 16b, 16c, and 16d until at process block 72, the last autonomous control unit in the material path is successfully bid for each chain and the program proceeds to process block 104 and the completed plans are forwarded to the product autonomous control unit in the controller 20 to be evaluated.

The product autonomous control unit in controller 20 may then accept one of the plans or may change the job description in a process analogous to the counterbidding proposal and the process may be repeated. As a result of the possibility of unresolvable bidding outcomes, the product autonomous control unit 16 normally produces a time limit on the process which, if exceeded, causes the process to indicate a failure.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An automatically configurable rolling mill system comprising:
   a rolling mill having an entrance receiving billets at an input temperature, a set of rolls rolling a received billet to change the billets by a rolling diameter as moved at a rolling speed, and an exit discharging the rolled billet at an output temperature, the rolling mill system comprising:
   a rolling mill controller having:
      (a) an electronic memory holding data representing:
         (i) rolling mill constraints indicating constraints on the operation of the rolling mill;
         (ii) inter-machine relationships indicating physical operating parameters of the rolling mill dependent on physical operating parameters of other machines to which the rolling mill is connected;
      (b) an electronic computer executing a stored program to:
         (i) receive a job plan describing a job to be performed by the rolling mill and the other machines
         (ii) modify the rolling mill constraints identified by the inter-machine relationships, by the corresponding machine constraints of the other machines;
         (iii) after the modification of (ii), exchange bids and counterbids with the other machines proposing completion or portions of the job by the rolling mill and the other machines; and
         (iv) evaluate the feasibility of the bids and counterbids against the modified rolling mill constraints.

2. The rolling mill system of claim 1 wherein the modified rolling mill constraints are selected from the group consisting of the input temperature, the rolling speed, and the output temperature.

3. The rolling mill system of claim 1:
   wherein the memory holds multiple rolling machine constraints and inter-machine relationships identified to different material paths between the rolling mill and the other machines, and wherein the rolling mill constraints associated with a given material path are modified by the machine constraints of only machines related by the inter-machine relationships associated with the given material path.

4. The industrial control system of claim 1:
wherein the job description describes a single material path between the rolling mill and other machines; and
wherein the evaluation of the feasibility of the bids and counterbids by the electronic computer is based on the modified rolling mill constraints associated with the single material path.

5. The industrial control system of claim 1 wherein the electronic computer evaluates the feasibility of the bids and counterbids by:
(v) in response to the job plan and bids from other machines, creating a bid for the job plan describing performance of a portion of the job plan that may be performed by the rolling mill according to the modified rolling mill constraints, and in the alternative creating a counterbid proposing further modification of the rolling mill constraints;
(vi) in response to counterbids by other machines, creating a modified bid for the job plan describing performance of a portion of the job plan that may be performed by the rolling mill according to the modified rolling mill constraints adjusted by the received counterbid, and in the alternative creating a counterbid proposing new rolling mill constraints within the modified rolling mill constraints.

6. The industrial control system of claim 1 wherein the rolling mill constraints are a range of operating parameters and the modification of the rolling mill constraints produces a multivalued range of operating parameters that is a subset of the range of operating parameters.

7. The automatically configurable rolling mill system of claim 1 further including:
a reheat furnace having an entrance receiving billets at an input temperature, a heater heating the billets to a reheat temperature and at an exit discharging the billets at the reheat temperature;
a reheat controller having:
(a) an electronic memory holding data representing:
(i) reheat furnace constraints indicating constraints on the operation of the reheat furnace;
(ii) inter-machine relationships indicating physical operating parameters of the reheat furnace dependent on physical operating parameters of other machines to which the reheat furnace is connected;
(b) an electronic computer executing a stored program to:
(i) receive the job plan describing a job to be performed by the reheat furnace and the other machines;
(ii) modify the reheat furnace constraints identified by the inter-machine relationships, by the corresponding machine constraints of the other machines;
(iii) after the modification of (ii), exchange bids and counterbids with the other machines proposing completion or portions of the job by the reheat furnace and the other machines; and
(iv) evaluate the feasibility of the bids and counterbids against the modified reheat furnace constraints.

8. The rolling mill system of claim 7 wherein the modified reheat furnace constraints are selected from the group consisting of the input temperature and the reheat temperature.

9. The automatically configurable rolling mill system of claim 1 further including:
a cooling bath having an entrance receiving billets at an input temperature, a cooling medium cooling the billets to a cooled temperature and an exit discharging the billets at the cooled temperature;
a cooling bath controller having:
(a) an electronic memory holding data representing:
(i) cooling bath constraints indicating constraints on the operation of the cooling bath;
(ii) inter-machine relationships indicating physical operating parameters of the cooling bath dependent on physical operating parameters of other machines to which the cooling bath is connected;
(b) an electronic computer executing a stored program to:
(i) receive the job plan describing a job to be performed by the cooling bath and the other machines;
(ii) modify the cooling bath constraints identified by the inter-machine relationships, by the corresponding machine constraints of the other machines;
(iii) after the modification of (ii), exchange bids and counterbids with the other machines proposing completion or portions of the job by the cooling bath and the other machines; and
(iv) evaluate the feasibility of the bids and counterbids against the modified cooling bath constraints.

10. The rolling mill system of claim 9 wherein the modified cooling bath constraints are selected from the group consisting of the input temperature and the reheat temperature.

11. The automatically configurable rolling mill system of claim 1 further including:
a reheat furnace having an entrance receiving billets at an input temperature, a heater heating the billets to a reheat temperature and an exit discharging the billets at the reheat temperature;
a reheat controller having;
(a) an electronic memory holding data representing:
(i) reheat furnace constraints indicating constraints on the operation of the reheat furnace;
(ii) inter-machine relationships indicating physical operating parameters of the reheat furnace dependent on physical operating parameters of other machines to which the reheat furnace is connected;
(b) an electronic computer executing a stored program to:
(i) receive the job plan describing a job to be performed by the reheat furnace and the other machines;
(ii) modify the reheat furnace constraints identified by the inter-machine relationships by the corresponding machine constraints of the other machines;
(iii) after the modification of (ii), exchange bids and counterbids with the other machines proposing completion or portions of the job by the reheat furnace and the other machines; and
(iv) evaluate the feasibility of the bids and counterbids against the modified reheat furnace constraints.

12. The rolling mill system of claim 11 wherein the modified reheat furnace constraints are selected from the group consisting of the input temperature and the reheat temperature.

* * * * *